April 14, 1964 W. R. EDWARDS ETAL 3,129,265
REGENERATION OF FAT ACID EXTRACTS OF TERTIARY OLEFINS
INCLUDING CHILLING OF THE REGENERATED ACID
Filed June 7, 1961
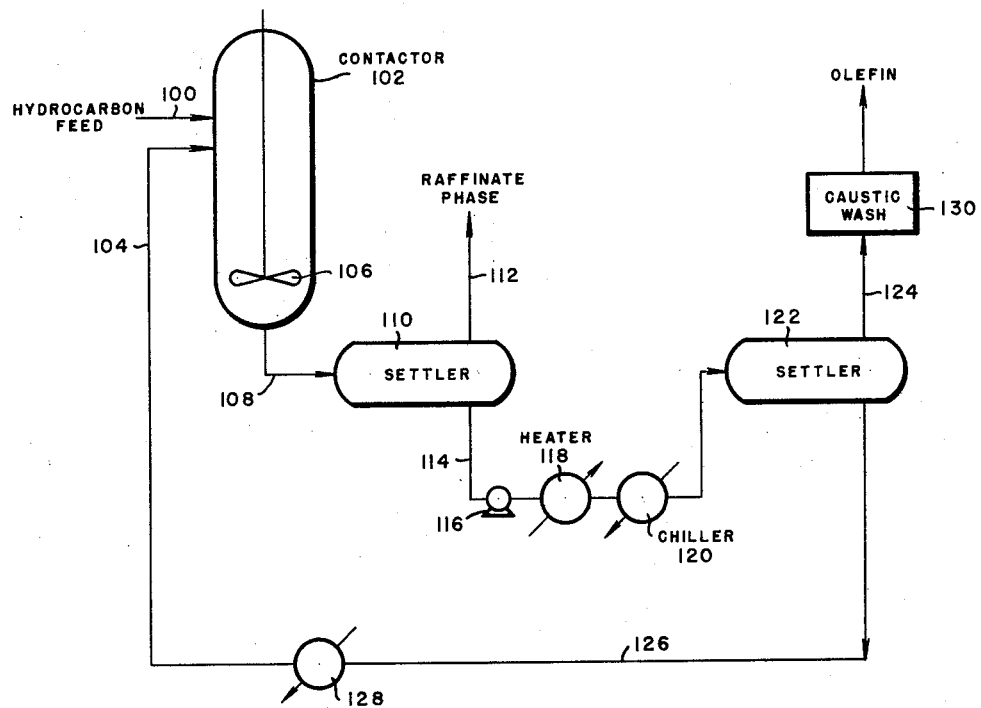
INVENTORS.
WILLIAM R. EDWARDS,
ROBERT D. WESSELHOFT,
BY
*Sylvester H. Brock, Jr.*
ATTORNEY.

United States Patent Office 3,129,265
Patented Apr. 14, 1964

3,129,265
REGENERATION OF FAT ACID EXTRACTS OF TERTIARY OLEFINS INCLUDING CHILLING OF THE REGENERATED ACID
William R. Edwards and Robert D. Wesselhoft, Baytown, Tex., assignors, by mesne assignments, to Esso Research and Engineering Company, Elizabeth, N.J., a corporation of Delaware
Filed June 7, 1961, Ser. No. 115,399
15 Claims. (Cl. 260—677)

The present invention relates to the recovery of tertiary olefins having from 4 to 6 carbon atoms from an admixture with isomers thereof. More particularly, the present invention deals with the selective extraction of said olefins with sulfuric acid and the release of the tertiary olefins from the acid by means of quickly heating the solution to a minimum temperature at which substantially all of the olefins are released (as more particularly set forth in our copending application Serial No. 115,400, filed June 7, 1961, entitled "Extraction Process"), followed by a quick chilling of the olefin-acid mixture to minimize polymerization of the olefins.

By the practice of the present invention, a new and unexpected method of recovering tertiary olefins is provided for use with the previously-known method of selectively absorbing tertiary olefins from admixture with their isomers by contacting the mixture with concentrated sulfuric acid. By the practice of the prior art methods, a hydrocarbon cut containing a tertiary olefin and its isomers of a like number of carbon atoms is contacted at moderate temperatures (20° F. to 100° F.) with 60% to 80% (by weight) sulfuric acid. The contact of the acid and the mixed hydrocarbon stream results in the formation of an acid extract phase which contains the tertiary olefins in chemical combination with the acid and a hydrocarbon raffinate phase which contains unabsorbed isomers of the tertiary olefin. These phases are separated and the acid extract is regenerated by one of a number of methods, among which are steam stripping, hydrocarbon vapor stripping, etc. In each of these instances it has been thought to be necessary to dilute the fat acid extract before regeneration in order to minimize the formation of polymer within the olefin phase which is in contact with the acid. This, of course, necessitates the reconcentration of the sulfuric acid before it is suitable for reuse as an extraction liquid in the first stage of the operation. Where dilution of the acid phase has not been used, the prior art teaches the heating of the acid extract without dilution to form a polymer of the olefin which has been absorbed and recovery of the olefin in the polymerized form. Obviously, this is unsuitable where the recovery of purified tertiary olefins in the unpolymerized state is desired.

By the practice of the present invention, the olefin is released from the acid phase by quickly heating the fat acid to a temperature where such release is realized, and then chilling the separated phases before substantial polymerization has taken place. The olefin is recovered in an unpolymerized form substantially uncontaminated by other hydrocarbons and may be prepared for sale by simple means such as a caustic wash.

It has been found that if the temperature at which polymerization occurs is maintained for an appreciable period of time while the olefin is in contact with concentrated acid, substantial polymerization losses occur. Conversely, it has been found by the practice of the present invention that if the temperature is maintained for only a short period of time after the formation of the released olefin phase, then polymerization is unexpectedly controlled within acceptable limits. As illustrated by the practice of the present invention, such results are consistently obtained. Surprisingly, there is a minimum of recombination of the tertiary olefin with the concentrated acid after chilling below the release temperature.

In order to understand more fully the practice of the present invention, reference is made to the figure wherein a hydrocarbon stream containing a tertiary olefin in admixture with its isomers is introduced by way of line 100 into a contactor 102, which may comprise a number of contactors in series, but is shown as a single unit for simplicity. The hydrocarbon mixture is contacted with 60% to 80% sulfuric acid which is introduced by way of line 104 from a source later to be discussed. The acid and hydrocarbon are brought into intimate contact by means of a mixer 106 driven by a prime mover (not shown). After the period of contact, the acid and hydrocarbon are passed by way of line 108 into a settler 110 wherein the phases are allowed to separate and the raffinate phase withdrawn by way of line 112. The fat acid or extract phase is withdrawn from the settler by way of line 114 and passed by means of pump 116 at a high rate of speed through heater 118 and chiller 120 immediately following. The chilled fat acid phase is then passed into a settler 122 wherein the hydrocarbon and the acid are allowed to separate. The hydrocarbon phase is decanted through line 124 as substantially pure tertiary olefin, while the concentrated, now lean, acid is returned by way of line 126 to the initial extraction stage. The lean acid may be further cooled if desired by means of exchanger 128. The recovered olefin may be treated to produce a marketable product by means of a caustic wash 130, wherein any residual acidity is neutralized.

As is apparent from a consideration of the flow diagram, a simple and straightforward process for the extraction and re-extraction of tertiary olefins is presented, involving a minimum of equipment and process energy. Thus, capital expenditure and operating costs are minimized.

As exemplary of the practice of the present invention, runs were made involving 2-methylbutene-1 and 2-methylbutene-2 within a sulfuric acid fat extract, and a run wherein isobutylene was recovered from a fat acid extract of sulfuric acid. These examples are given below.

*Example I*

A hydrocarbon mixture of 5 carbon atom hydrocarbons was contacted with 65% by weight sulfuric acid at 30° F. to produce an extract containing 30 weight percent methylbutene which was separated from the unabsorbed raffinate phase. The fat acid was then pumped through a copper coil immersed in boiling water at a rate such that the apparent residence time of the fat acid in the heater coil was 8 seconds. The outlet temperature was about 212° F. The mixture of acid and olefin which was released during the heating period was then immediately passed through a coil chilled by immersion in a low temperature (about −20° F.) bath and collected in a graduate. The total time above polymerization temperature was less than 10 seconds. The hydrocarbon layer was analyzed and found to contain less than 1% polymer, the remainder being 2-methylbutene-1 and 2-methylbutene-2. Determination of the lean acid gravity indicated that complete regeneration of the olefin had been obtained.

*Example II*

An acid extract containing 33 weight percent isobutylene was prepared by contacting 4 carbon atom hydrocarbons with 65% sulfuric acid at 80° F., and was separated from the raffinate phase. The fat acid extract was pumped through a copper coil immersed in a boiling orthoxylene bath at a rate such that the apparent residence time of the acid in the heated coil was 2 seconds. The resulting mixture of acid and released olefin was then immediately passed through a cooling coil immersed in a low temperature (about −40° F.) bath and collected in a graduate. The total time above polymerization temperature was less than 3 seconds. The hydrocarbon layer was analyzed and found to contain only 7% polymer, the remainder being isobutylene. Determination of the acid gravity indicated that only 4 to 5 weight percent of the isobutylene remained in the acid. The temperature of the heating bath was 290° F.

As shown in the examples above, the problem of polymerization is minimized by the practice of the present invention. Particularly surprising is the formation of only 7% polymer in the "heat springing" of isobutylene, which is highly polymerizable.

The polymerization of the tertiary olefins within the fat acid extract occurs whenever the temperature is raised above a minimum level, which is referred to in this application as the "polymerization temperature." Polymerization thus will occur during the period of time after the acid extract has been heated above the polymerization temperature and until the fat acid has been cooled after release of the olefin to a temperature corresponding to the polymerization level. This polymerization temperature above which polymerization occurs and below which the acid-olefin liquid must be chilled varies with the olefin and with the acid strength. Similarly, the temperatures to which the acid extract of the various olefins must be heated in order to obtain the release of substantially all of the dissolved olefin varies according to the olefin and with the acid strength. For example, at about 65% acid strength, isobutylene extracts must be heated to a temperature of 220° F. to 280° F. in order to release the olefin, while polymerization occurs when the temperature is in excess of 120° F. It has been found that in the recovery of isobutylene from the fat acid extract by thermal regeneration, the period of time during which the isobutylene-acid liquid is above 120° F. must be limited to a maximum of 3 seconds.

For methyl butenes in 65% acid, polymerization occurs when the temperature is in excess of 90° F. whereas the fat acid must be heated to a temperature within the range of about 160° F. to about 220° F. for accomplishing the substantially complete release of the dissolved olefins. In order to avoid excessive polymerization while regenerating the acid-bound methyl butenes, the period of time at which the liquid mixture is above 90° F. (that is, from the heating step until the accomplishment of the cooling to the polymerization temperature) must be limited to a maximum of 15 seconds.

Where $C_6$ tertiary olefins are being recovered from 65% sulfuric acids, polymerization occurs at temperatures exceeding 140° F., whereas the fat acid must be heated to about that temperature in order to accomplish complete regeneration with a range of 150° F. to 250° F. being preferred. It has been found in the case of the $C_6$ tertiary olefins in 65% sulfuric acid, however, that the rate of polymerization is slow enough to allow a residence time as long as 10 minutes without suffering prohibitive polymerization losses.

In order to accomplish the chilling of the acid-olefin mixture after release of the olefin within a time period as above described, the chilling bath must be maintained at a temperature sufficiently low that the rate of cooling or chilling will drop the temperature of the liquid mixture below the polymerization temperature within the prescribed period. While the examples have shown the use of low temperature baths to show the desired chilling function, it is also possible to utilize on the commercial scale a circulating coolant such as a brine solution at about 0° F., or to utilize liquid gases such as propane; or auto-refrigeration may be employed by flashing off the regenerated olefin at a high rate sufficient to cool the liquid admixture within the time limits as above set forth. These variables can be easily determined for the olefin and acid involved by those skilled in the art, and the temperature and capacity of both the heating and chilling means may vary by reason of the physical equipment being used; the time period must be adjusted according to the olefin involved and the acid strength used, but may be easily determined by a skilled chemist.

The important aspect and essence of this invention is, however, that the chilling step immediately follows the heating step in the regeneration process so that the time period at which the acid-olefin mixture remains above the polymerizing temperature is minimized so that polymerization may be kept at an acceptable level.

The inventors have set forth their invention in detail, including a preferred mode of practicing the invention. What is desired to be protected by Letters Patent should not be limited by the specific examples, however, but only by the appended claims.

We claim:

1. A method of separating isobutylene from a fat acid extract thereof which comprises heating the fat acid extract to a temperature of about 220° F. to 280° F. to cause the release of said isobutylene from said acid extract, whereby an acid-isobutylene mixture is obtained, immediately after the release of the isobutylene chilling the acid isobutylene mixture to a temperature not exceeding 120° F. after a residence time of not more than 3 seconds, whereby polymerization losses are minimized, and recovering said isobutylene as a substantially pure product.

2. A method of separating a tertiary 2-methylbutene from a fat acid extract thereof which comprises heating the fat acid extract to a temperature of about 160° F. to 220° F. to cause the release of said tertiary 2-methylbutene from said acid extract, whereby an acid-tertiary 2-methylbutene mixture is obtained, immediately after the release of the tertiary 2-methylbutene chilling the acid-tertiary 2-methylbutene mixture to a temperature not exceeding 90° F. after a residence time of not more than 15 seconds, whereby polymerization losses are minimized, and recovering said tertiary 2-methylbutene as a substantially pure product.

3. A method of separating a tertiary isohexene from a fat acid extract thereof which comprises heating the extract to a temperature of at least about 150° F. to cause the release of said tertiary isohexene from said acid extract, whereby an acid-tertiary isohexene mixture is obtained, immediately after the release of the tertiary isohexene chilling the acid-tertiary isohexene mixture to a temperature not exceeding 140° F. after a residence time of not more than 10 minutes, whereby polymerization losses are minimized, and recovering said tertiary isohexene as a substantially pure product.

4. A method of recovering isobutylene from a fat acid extract thereof in 60 weight percent to 80 weight percent sulfuric acid which comprises heating said extract to a temperature of about 220° F. to 280° F. to cause the release of said isobutylene from said acid extract, whereby an acid-isobutylene mixture is obtained, immediately after the release of the isobutylene chilling the acid-isobutylene mixture to a temperature not exceeding 120° F. after a residence time of not more than 3 seconds, whereby polymerization losses are minimized, and recovering said isobutylene as a substantially pure product.

5. A method in accordance with claim 4 wherein the sulfuric acid concentration is about 65 weight percent.

6. A method of recovering a tertiary 2-methylbutene from a fat acid extract thereof in 60 weight percent to 80 weight percent sulfuric acid which comprises heating said extract to a temperature of about 160° F. to 220° F. to cause the release of said tertiary 2-methylbutene from said acid extract, whereby an acid-tertiary 2-methylbutene mixture is obtained, immediately after the release of the tertiary 2-methylbutene chilling the acid-tertiary 2-methylbutene mixture to a temperature not exceeding 90° F. after a residence time of not more than 15 seconds, whereby polymerization losses are minimized, and recovering said tertiary 2-methylbutene as a substantially pure product.

7. A method in accordance with claim 6 wherein the sulfuric acid concentration is about 65 weight percent.

8. A method of recovering a tertiary isohexene from a fat acid extract thereof in 60 weight percent to 80 weight percent sulfuric acid which comprises heating said acid extract to a temperature of at least about 150° F. to cause the release of said tertiary isohexene from said acid extract, whereby an acid-tertiary isohexene mixture is obtained, immediately after release of the tertiary isohexenes chilling the acid-tertiary isohexene mixture to a temperature not exceeding 140° F. after a residence time of not greater than 10 minutes, whereby polymerization losses are minimized, and recovering said tertiary isohexene as a substantially pure product.

9. A method in accordance with claim 8 wherein the sulfuric acid concentration is about 65 weight percent.

10. A method of recovering isobutylene from admixture with the hydrocarbon isomers thereof which comprises contacting an admixture of hydrocarbons containing isobutylene with 60 weight percent to 80 weight percent $H_2SO_4$ at a temperature within the range of 50° F. to 120° F. to form a raffinate phase and a fat acid extract phase, separating said extract phase from said raffinate phase, rapidly heating said extract phase to a temperature within the range of 220° F. to 280° F. to cause said isobutylene to be released from said acid, immediately chilling the acid extract and released isobutylene to a temperature below about 120° F. at a total residence time above the polymerization temperature of not greater than 3 seconds to prevent undue polymerization, and separating said released isobutylene from said acid to produce a substantially pure product.

11. A method in accordance with claim 10 wherein the sulfuric acid concentration is 65 weight percent.

12. A method of recovering a tertiary 2-methylbutene from admixture with the hydrocarbon isomers thereof which comprises contacting an admixture of hydrocarbons containing said tertiary 2-methylbutene with 60 weight percent to 80 weight percent $H_2SO_4$ at a temperature within the range of 20° F. to 60° F. to form a raffinate phase and a fat acid extract phase, separating said extract phase from said raffinate phase, rapidly heating said extract phase to a temperature within the range of 160° F. to 220° F. to cause said tertiary 2-methylbutene to be released from said acid, immediately chilling the acid extract and released tertiary 2-methylbutene to a temperature below about 90° F. at a total residence time above the polymerization temperature of not greater than 15 seconds to prevent undue polymerization, and separating said released tertiary 2-methylbutene from said acid to produce a substantially pure product.

13. A method in accordance with claim 12 wherein the sulfuric acid concentration is 65 weight percent.

14. A method of recovering a tertiary isohexene from admixture with the hydrocarbon isomers thereof which comprises contacting an admixture of hydrocarbons containing said tertiary isohexene with 60 weight percent to 80 weight percent $H_2SO_4$ at a temperature within the range of 20° F. to 50° F. to form a raffinate phase and a fat acid extract phase, separating said extract phase from said raffinate phase, rapidly heating said extract phase to a temperature within the range of 140° F. to 250° F. to cause said tertiary isohexene to be released from said acid, immediately chilling the acid extract and released tertiary isohexene to a temperature below about 140° F. after a total residence time above the polymerization temperature of not greater than about 10 minutes to prevent undue polymerization, and separating said released tertiary isohexene from said acid to produce a substantially pure product.

15. A method in accordance with claim 14 wherein the sulfuric acid concentration is 65 weight percent.

References Cited in the file of this patent

UNITED STATES PATENTS

| | | |
|---|---|---|
| 2,424,186 | Packie et al. | July 15, 1947 |
| 2,961,472 | Welch et al. | Nov. 22, 1960 |
| 2,968,682 | Crouse et al. | Jan. 17, 1961 |